United States Patent
Ryu et al.

(10) Patent No.: US 8,698,947 B2
(45) Date of Patent: Apr. 15, 2014

(54) DIGITAL PHOTOGRAPHING APPARATUS AND METHOD OF CONTROLLING THE SAME

(75) Inventors: Hun-young Ryu, Hwaseong-si (KR); Ho-seon Lee, Anseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/471,645

(22) Filed: May 15, 2012

(65) Prior Publication Data

US 2012/0293708 A1    Nov. 22, 2012

(30) Foreign Application Priority Data

May 17, 2011    (KR) .................. 10-2011-0046388

(51) Int. Cl.
*H04N 5/238*    (2006.01)

(52) U.S. Cl.
USPC .......................................................... 348/363

(58) Field of Classification Search
USPC .................. 348/222.1, 229, 1, 362, 229.1
See application file for complete search history.

(56) References Cited

U.S. PATENT DOCUMENTS

| | | | |
|---|---|---|---|
| 2002/0080247 A1* | 6/2002 | Takahashi et al. | 348/229 |
| 2005/0052565 A1* | 3/2005 | Hamada | 348/362 |
| 2007/0013804 A1* | 1/2007 | Noto | 348/335 |
| 2008/0084486 A1* | 4/2008 | Enge et al. | 348/239 |
| 2010/0189356 A1* | 7/2010 | Sugita | 382/190 |

* cited by examiner

*Primary Examiner* — Gevell Selby
(74) *Attorney, Agent, or Firm* — Drinker Biddle & Reath LLP (57) ABSTRACT

A digital photographing apparatus and a method of controlling the same may reduce a photographing time by performing an operation of reading out data, an operation of closing an iris, and an operation of opening a shutter in parallel.

15 Claims, 6 Drawing Sheets

DIGITAL PHOTOGRAPHING APPARATUS AND METHOD OF CONTROLLING THE SAME

CROSS-REFERENCE TO RELATED PATENT APPLICATION

This application claims the priority benefit of Korean Patent Application No. 10-2011-0046388, filed on May 17, 2011, in the Korean Intellectual Property Office, the disclosure of which is incorporated herein in its entirety by reference.

BACKGROUND

1. Field

Embodiments relate to a digital photographing apparatus and a method of controlling the same.

2. Description of the Related Art

In general, when a digital photographing apparatus uses a focal plane shutter, a continuous shooting speed of the digital photographing apparatus is directly affected by a shutter operating speed, an operation mechanism, and a time taken to read out imaging data from an image pickup device such as a complementary metal oxide semiconductor image sensor (CIS) or a charge-coupled device (CCD) sensor.

Since an image sensor reads out imaging data only when the image sensor is completely closed after being exposed to light, the imaging data is read out when a shutter completely stops operating.

SUMMARY

Embodiments include a digital photographing apparatus and a method of controlling the same which may reduce a photographing time by performing an operation of reading out imaging data and an operation of opening a shutter in parallel.

According to an embodiment, a method of controlling a digital photographing apparatus includes: displaying an image signal input through an image pickup device as a live view image; firstly driving a shutter; reading out data from the image pickup device; and secondly driving the shutter at a time overlapping with a duration for which the data is read out and closing an iris when the shutter is driven.

The time overlapping with the duration for which the data is read out may precede a time when the duration for the data is read out ends.

The shutter may include a front curtain and a rear curtain, wherein at least one of the front curtain and the rear curtain moves vertically. The secondly driving of the shutter may include: firstly moving upward a front curtain and a rear curtain of the shutter at the time overlapping with the duration for which the data is read out; secondly moving downward the front curtain of the shutter before the duration for which the data is read out ends; thirdly moving upward the front curtain of the shutter at a time when the duration for which the data is read out ends; and opening and closing the iris during the firstly through thirdly moving.

The iris may be opened during the firstly moving, and the iris may be closed during the secondly and thirdly moving.

The firstly driving may include firstly driving the shutter in response to a shutter-release signal.

The method may further include, after the firstly driving, exposing the image pickup device to light.

The shutter may be a focal plane shutter.

According to another embodiment, a method of controlling a digital photographing apparatus includes: displaying a live view image; firstly driving a shutter in response to a shutter-release signal in order to perform a first photographing operation; exposing an image pickup device to light; secondly driving the shutter at a time overlapping with a duration for which data is read out and closing an iris when the shutter is driven; and thirdly driving the shutter in order to perform a next photographing operation.

The secondly driving may include: firstly moving upward a front curtain and a rear curtain of the shutter at the time overlapping with the duration for which the data is read out; secondly moving downward the front curtain of the shutter before the duration for which the data is read out ends; thirdly moving upward the front curtain of the shutter at a time when the duration for which the data is read out ends; and opening and closing the iris during the firstly through thirdly moving.

The iris may be opened during the firstly moving, and the iris may be closed during the secondly and thirdly moving.

The thirdly driving may include exposing the image pickup device to light.

According to another embodiment, a digital photographing apparatus includes: an image pickup device that captures an image of a subject; and a digital signal processor that outputs a first driving control signal for driving a shutter in response to a shutter-release signal, reads out data from the image pickup device, drives the shutter at a time overlapping with a duration for which the data is read out, and outputs a second driving control signal for closing an iris when the shutter is driven.

The digital signal processor may include: a shutter driving controller that outputs the first driving control signal and the second driving control signal; an iris driving controller that outputs a control signal for opening or closing the iris while the shutter is driven; and a data reader that reads out data from the image pickup device.

The shutter may include a front curtain and a rear curtain, wherein at least one of the front curtain and the rear curtain moves vertically, and wherein the second driving control signal is a signal for moving upward the front curtain and the rear curtain of the shutter at the time overlapping with the duration for which the data is read out, moving downward the front curtain of the shutter before the duration for which the data is read out ends, driving upward the front curtain of the shutter at a time when the duration for which the data is read out ends, and opening and closing the iris while at least one of the front curtain and the rear curtain moves.

The iris may be opened while the front curtain and the rear curtain of the shutter move upward, and the iris may be closed while the front curtain of the shutter moves downward and then moves upward.

The digital signal processor may control a live view image to be displayed, after outputting the second driving control signal.

The digital signal processor may expose the image pickup device to light in order to perform a continuous photographing operation, after outputting the second driving control signal.

BRIEF DESCRIPTION OF THE DRAWINGS

The above and other features and advantages will become more apparent by describing in detail exemplary embodiments with reference to the attached drawings in which.

DETAILED DESCRIPTION

Particular embodiments will be illustrated in the drawings and described in detail in the written description. However, this is not intended to be limiting to particular modes of practice, and it is to be appreciated that all changes, equivalents, and substitutes that do not depart from the spirit and technical scope of the invention are encompassed in embodiments of the invention. In the description, certain detailed explanations of related art are omitted when it is deemed that they may unnecessarily obscure the essence of the invention. The terminology used herein is for the purpose of describing particular embodiments only and is not intended to be limiting of exemplary embodiments.

Embodiments will now be described more fully with reference to the accompanying drawings, in which exemplary embodiments are shown. The same or corresponding elements are denoted by the same reference numerals and a repeated explanation thereof will not be given.

Figure 1:
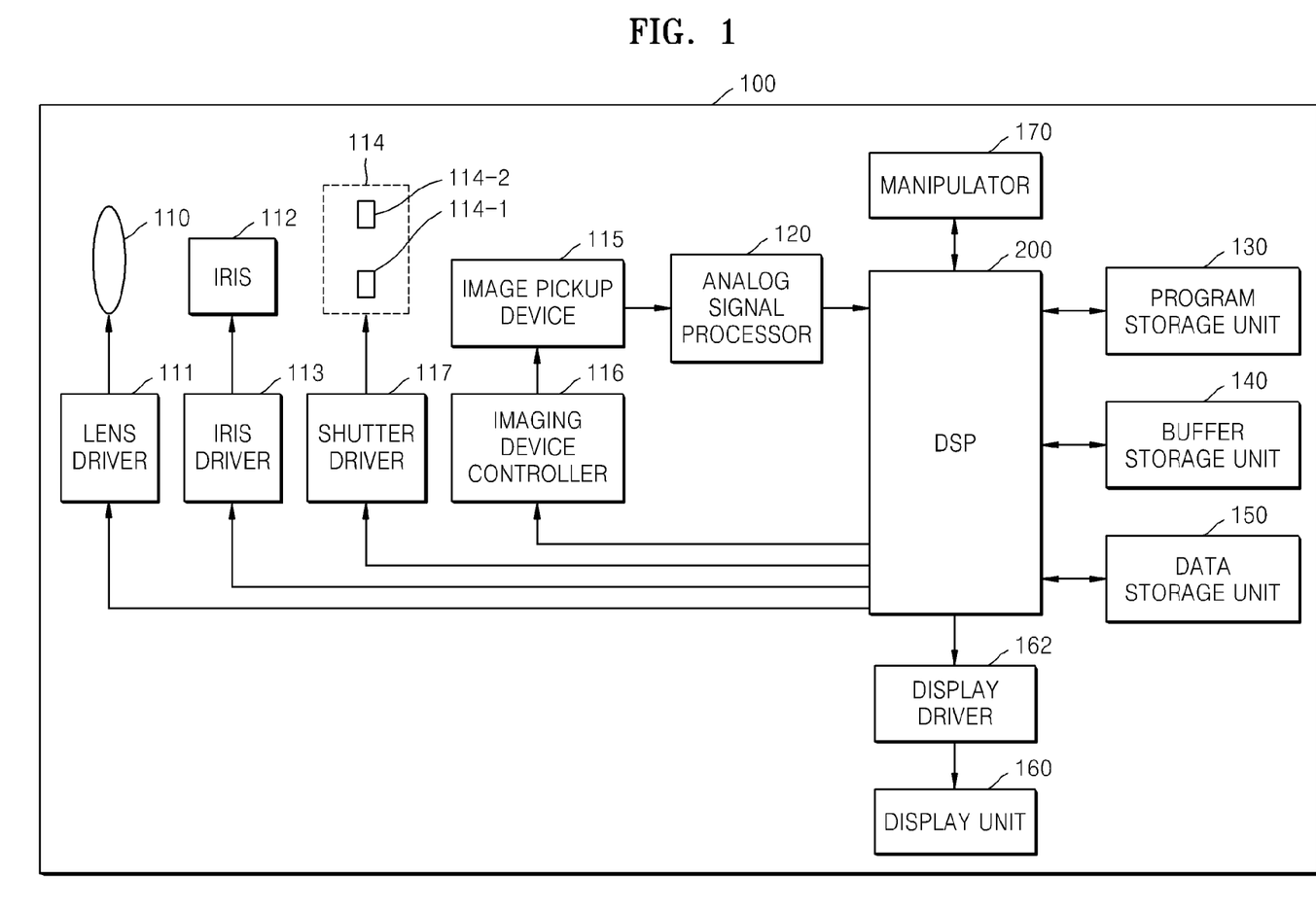
FIG. 1 is a block diagram illustrating a digital photographing apparatus, according to an embodiment.

FIG. 1 is a block diagram illustrating a digital photographing apparatus, according to an embodiment.

A digital camera 100 will be explained as the digital photographing apparatus in FIG. 1. However, the digital photographing apparatus is not limited thereto, and a digital device such as a camera phone, a personal digital assistant (PDA), or a portable multimedia player (PMP) may be used as the digital photographing apparatus.

The digital camera 100 may include a lens unit 110, a lens driver 111, an iris 112, an iris driver 113, an image pickup device 115, an imaging device controller 116, an analog signal processor 120, a program storage unit 130, a buffer storage unit 140, a data storage unit 150, a display driver 162, a display unit 160, a digital signal processor (DSP) 200, and a manipulator 170. The lens unit 110, the lens driver 111, the iris 112, the iris driver 113, a shutter 114, a shutter driver 117, the image pickup device 115, the imaging device controller 116, and the analog signal processor 120 may be collectively referred to as an imaging unit. The shutter 114 includes a front curtain 114-1 and a rear curtain 114-2, and vertically moves according to a driving control signal of the shutter driver 117. The shutter 114 is a focal plane shutter. In general, a focal plane shutter includes two cloth curtains or metal curtains provided in front of a focal surface of a lens which horizontally or vertically move, and exposes a photosensitive material surface by adjusting a slit between a front curtain and a rear curtain or running speeds of the front and rear curtains. The focal plane shutter is often installed in a lens-exchangeable camera. The focal plane shutter is often installed in a camera having a plate smaller than or equal to 6×6 cm, and determines an exposure time by adjusting only a width of the slit by using a speed regulator or an electromagnet that is electrically controlled while maintaining the running speeds of the front and rear curtains. Main characteristics of the focal plane shutter are that an exchangeable lens may be used and a high speed shutter may be easily realized. The lens unit 110 focuses an optical signal. The lens unit 110 includes a zoom lens for narrowing or widening a viewing angle according to a focal length and a focus lens for adjusting a focus on a subject. Each of the zoom lens and the focus lens may include one lens or a group of lenses. The iris 112 adjusts the amount of incident light by adjusting a degree of opening and closing the iris 112. The lens driver 111 and the iris driver 113 receive a control signal from the DSP 200 and respectively drive the lens unit 110 and the iris 112. The lens driver 111 adjusts a focal length by adjusting a position of a lens, and performs auto focusing, zooming, focusing, and so on. The iris driver 113 adjusts the degree of opening and closing the iris 112, and performs auto focusing, automatic exposure correction, focusing, depth of field adjustment, and so on by adjusting an F number or an iris value. In general, the iris 112 for adjusting the amount of light has the same structure as the shutter 114, and has a minimum radius even through which a certain amount of light may pass. In FIG. 1, the iris 112 is further tightly closed (for example, from a small iris with F22) to completely close the image pickup device 115, like the shutter 114. The iris 112 capable of completely closing the image pickup device 115 is in a closed state (f∞) or in an opened state.

The optical signal passing through the lens unit 110 reaches a light-receiving surface of the image pickup device 115 and forms an image of the subject. The image pickup device 115 may be a charge-coupled device (CCD), a complementary metal oxide semiconductor image sensor (CIS), or a high speed image sensor which converts the optical signal into an electrical signal. A sensitivity or the like of the image pickup device 115 may be adjusted by the imaging device controller 116. The imaging device controller 116 may control the image pickup device 115 according to a control signal that is automatically generated due to an image signal that is input in real time or a control signal that is manually input by a user.

An exposure time of the image pickup device 115 is adjusted according to a travel speed of the shutter 114. The shutter 114 adjusts the amount of light incident on the image pickup device 115 as the front curtain 114-1 and the rear curtain 114-2 move with a predetermined slit therebetween.

The analog signal processor 120 performs noise reduction, gain control, waveform shaping, and analog-digital conversion on an analog signal provided from the image pickup device 115.

The manipulator 170 is an element through which a control signal may be input from the user or the like. The manipulator 170 may include a shutter-release button for inputting a shutter-release signal to perform a photographing operation by exposing the image pickup device 115 to light for a predetermined period of time, a power button for inputting a control signal used to control power on/off of the digital camera 100, a wide angle-zoom button and a telephoto-zoom button for widening or narrowing a viewing angle according to an input, and other various functional buttons for selecting at least one mode/function from a text input mode, a photographing mode, a reproduction mode, a white balance setting function, and an exposure setting function. Also, in FIG. 1, the user may select an automatic image processing mode by using the manipulator 170. In the automatic image processing mode, an image processing type or an image processing degree is automatically set based on ambient brightness, instead of being manually set by the user. The manipulator 170 may include various buttons as described above, but the present embodiment is not limited thereto. The manipulator 170 may be any of types that enable the user to input a control signal, such as a keyboard, a touchpad, a touch screen, or a remote controller.

The digital camera 100 includes the program storage unit 130 for storing a program such as an operating system or application system for driving the digital camera 100, the buffer storage unit 140 for temporarily storing data required during an operation or data obtained via the operation, and the data storage unit 150 for storing various types of information required for the program such as an image file including an image signal.

In addition, the digital camera 100 includes the display unit 160 for displaying an operating state of the digital camera 100 or information about an image captured by the digital camera 100. The display unit 160 may provide visual information and auditory information to the user. In order to provide the visual information, the display unit 160 may be, for example, a liquid crystal display panel (LCD) or an organic light-emitting display (OLED) panel. The display driver 162 provides a driving signal to the display unit 160.

The digital camera 100 includes the DSP 200 for processing an input image signal and controlling the elements of the digital camera 100 according to the input image signal or an external input signal. The DSP 200 may perform image signal processing for improving image quality such as noise reduction in input image data, gamma correction, color filter array interpolation, color matrix correction, color correction, or color enhancement. Also, the DSP 200 may generate an image file by compressing image data generated during the image signal processing for improving image quality, or restore the image data from the image file. The image data may be compressed in a reversible or irreversible format. For example, the image data may be compressed in a joint photographic experts group (JPEG) format or a JPEG 2000 format. The compressed image data may be stored in the data storage unit 150. Also, the DSP 200 may perform coloring, blurring, edge emphasis, image interpolation, image recognition, and image effects. The image recognition may include face recognition and scene recognition. For example, the DSP 200 may perform brightness level adjustment, color correction, contrast adjustment, contour emphasis adjustment, screen splitting, character image generation, and image synthesis. Also, the DSP 200 may execute the program stored in the program storage unit 130, or include an additional module to generate a control signal for use in auto-focusing, zooming, focusing, and automatic exposure correction and provide the control signal to the lens driver 111, the iris driver 113, the imaging device controller 116, or the shutter driver 117, and may control operations of the elements included in the digital camera 100 such as the shutter 114 and a flash (not shown).

The DSP 200 outputs a driving control signal for driving the shutter 114 in response to a shutter-release signal by using the manipulator 170. Also, the DSP 200 performs an exposure operation by driving the shutter 114 to transmit light to the image pickup device 115, and a data read-out operation for reading out an electrical signal (hereinafter, referred to as data, an image signal, or an input image) accumulated through the image pickup device 115. Also, the DSP 200 performs a data read-out operation and an operation of driving the shutter 114 for preparing for next photographing in parallel by driving the shutter 114 at a time overlapping with a duration for which the data is read out while the data is read out from the image pickup device 115 and outputting again a control signal for closing and opening the iris 112 when the shutter 114 is driven.

Figure 2:
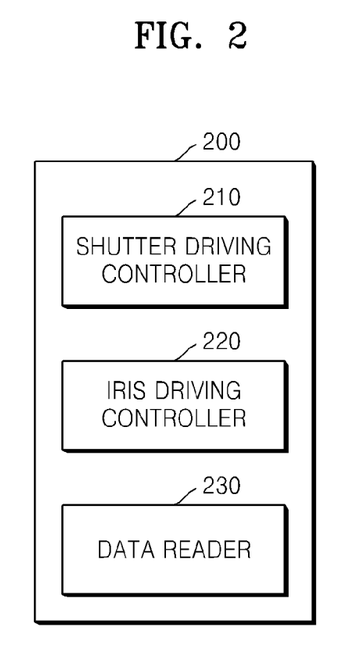
FIG. 2 is a block diagram illustrating a digital signal processor of the digital photographing apparatus of FIG. 1, according to an embodiment.

FIG. 2 is a block diagram illustrating the DSP 200 of the digital camera 100 of FIG. 1, according to an embodiment.

Referring to FIG. 2, the DSP 200 includes a shutter driving controller 210, an iris driving controller 220, and a data reader 230.

The shutter driving controller 210 outputs a first driving control signal and a second driving control signal. The first driving control signal is a signal for exposing the shutter 114 and reading out data in response to a shutter-release signal. An operation of the shutter 114 will be explained with reference to FIGS. 3 through 5.

The iris driving controller 220 outputs a control signal for opening and closing the iris 112. While data is read out, the iris 112 is closed or opened. An operation of the iris 112 will be explained with reference to FIGS. 3 through 5.

The data reader 230 outputs data from the image pickup device 115.

Figure 3:
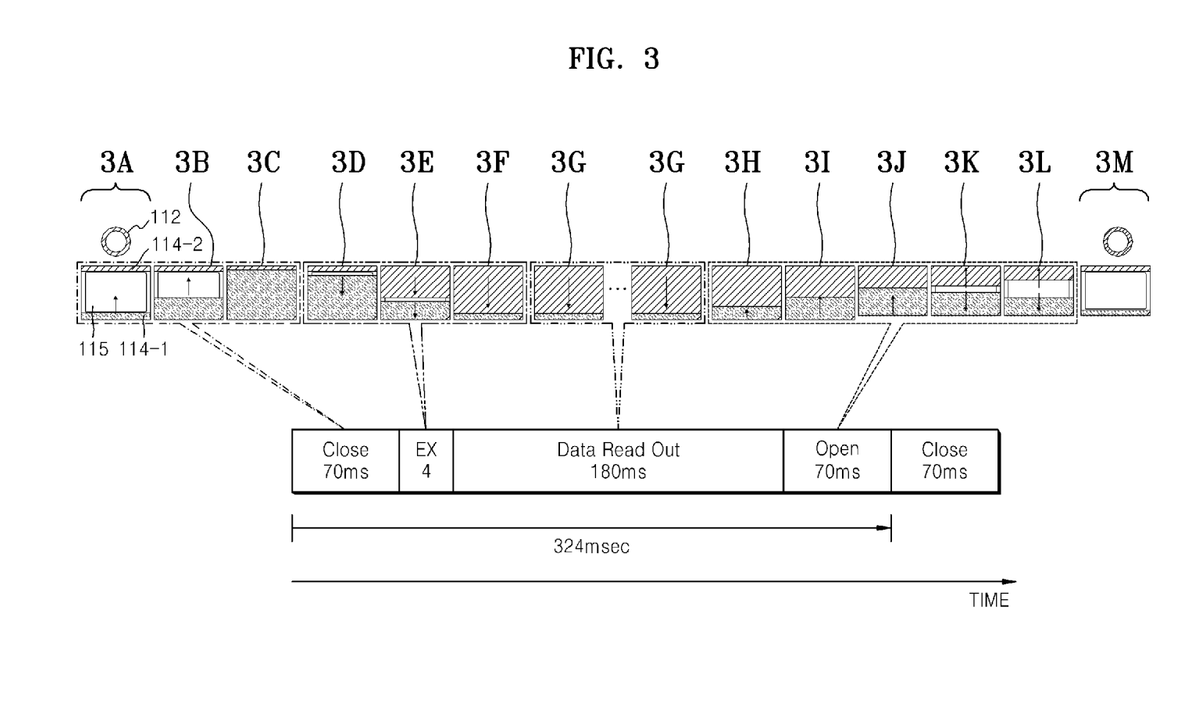
FIG. 3 is a diagram for explaining a movement of a shutter and a general photographing operation.

FIG. 3 is a diagram for explaining a movement of the shutter 114 and a general photographing operation.

Illustration 3A illustrates a live view state of the imaging unit. A live view is a function where a user takes a photograph via the display unit 160, e.g., an LCD, not a view finder. To this end, when both the front curtain 114-1 and the rear curtain 114-2 of the shutter 114 are opened, light passing through the lens unit 110 forms an image on the image pickup device 115.

Illustration 3B illustrates a changed state of the imaging unit where the shutter 114 is changed to a set value due to a shutter-release signal. Illustration 3C illustrates a closed state of the imaging unit. A photographing operation starts as the user completely presses the shutter-release button. The front curtain 114-1 moves upward according to a shutter-release signal corresponding to the shutter-release button to be coupled to the rear curtain 114-2, and the shutter 114 is maintained in the closed state such that light does not enter the image pickup device 115.

Illustrations 3D and 3E illustrate an exposed state of the imaging unit. An exposure operation starts as the front curtain 114-1 moves upward to be coupled to the rear curtain 114-2 as shown in illustration 3C, and then both the front curtain 114-1 and the rear curtain 114-2 move downward with a predetermined slit between the front and rear curtains 114-1 and 114-2 as shown in illustrations 3D and 3E. The slit is formed due to a difference between a time when the front curtain 114-1 begins to move and a time when the rear curtain 114-2 begins to move, and an exposure time may be adjusted according to travel speeds of the front and rear curtains 114-1 and 114-2. Accordingly, the exposure operation is performed through the slit between the front curtain 114-1 and the rear curtain 114-2.

Illustration 3F illustrates an exposure completed state of the imaging unit. Both the front curtain 114-1 and the rear curtain 114-2 move downward, and the rear curtain 114-2 moves further to be coupled to the front curtain 114-1. The exposure completed state is a state where no light enters the image pickup device 115.

Illustrations 3G illustrate a data read-out state. When the exposure operation is completed, data accumulated on the image pickup device 115 begins to be read out as shown in illustrations 3G. This is because a data read-out operation may be performed only when the image pickup device 115 is completely blocked.

Illustrations 3H, 3I, and 3J illustrate an opening preparation state of the imaging unit. The front curtain 114-1 and the rear curtain 114-2 move upward while contacting each other.

Illustrations 3K and 3L illustrate an opened state of the imaging unit. After the front curtain 114-1 and the rear curtain 114-2 move upward while contacting each other as illustrated in illustrations 3K and 3L, only the front curtain 114-1 moves downward, and the rear curtain 114-2 continuously moves upward as illustrated in illustrations 3K and 3L until the image pickup device 115 is completely opened as illustrated in illustration 3M. FIG. 3M illustrates a live view state of the imaging unit like FIG. 3A.

A photographing time in association with an operation of the shutter 114 in a general photographing operation will be explained with reference to FIG. 3. It is assumed that data processing speeds of the image pickup device 115, the shutter 114, and the DSP 200 which are factors for determining an exposure time, a data read-out time, and so on are the same.

When the shutter-release button is completely pressed in the live view state of illustration 3A, 70 ms is spent for the closed state of illustration 3C, and 4 ms is spent for the exposure corresponding to illustrations 3D through 3F. After the exposure is completed, 180 ms is spent for the data read-out operation of illustrations 3G. After the data read-out operation ends, since the opening preparation operation of illustrations 3H through 3J starts, 70 ms is spent to maintain the opened state of illustrations 3K and 3L. Accordingly, a total of 324 ms is spent as a total photographing time, that is, from pressing the shutter-release button to preparing for next photographing in a live view.

Figure 4:
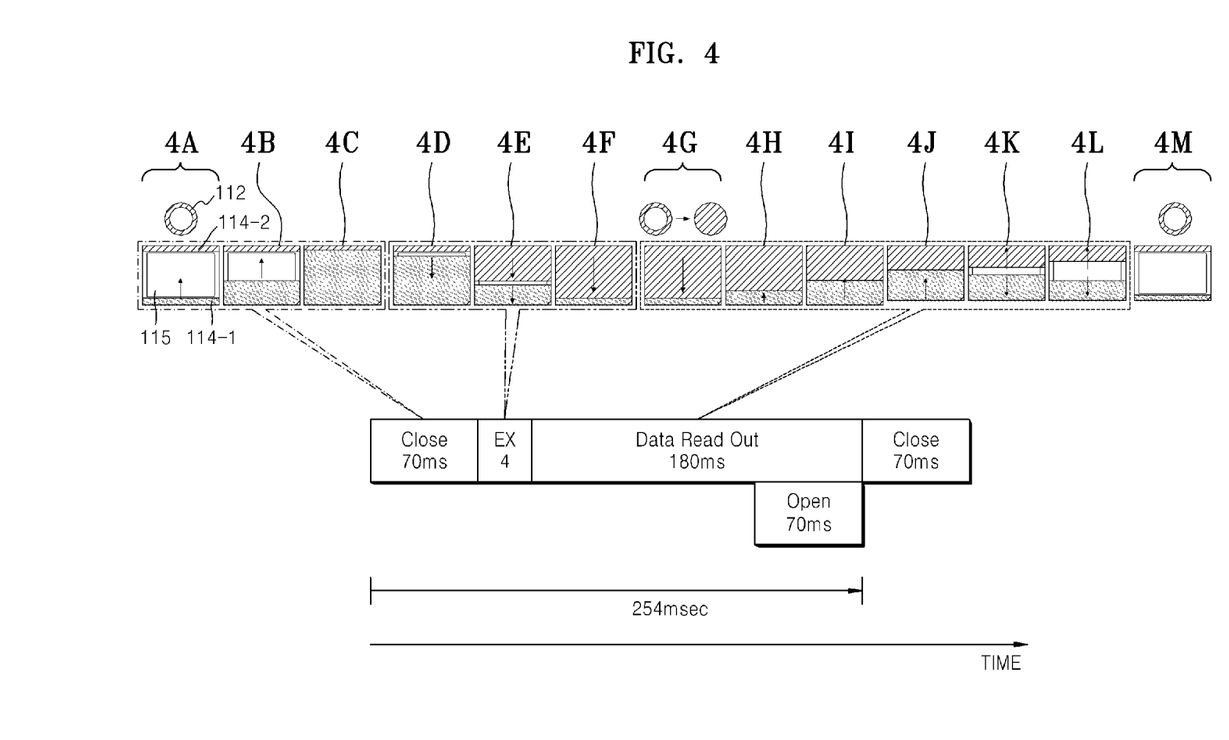
FIG. 4 is a diagram for explaining a movement of the shutter and a photographing operation, according to an embodiment.

FIG. 4 is a diagram for explaining a movement of the shutter 114 and a photographing operation, according to an embodiment.

When compared with FIG. 3, in FIG. 4, at a time overlapping with a duration for which data is read out as shown in illustration 4G, the iris 112 is changed from an opened state to a closed state, and the shutter 114 is prepared to be opened and is opened as shown in illustrations 4H through 4I.

In an opening preparation state as shown in illustrations 4H through 4I, since the front curtain 114-1 and the rear curtain 114-2 move upward while contacting each other to cover the image pickup device 115, the iris 112 is maintained in a small iris state (opened state). However, afterward, in an opened state as shown in illustrations 4K and 4L, only the front curtain 114-1 moves downward and the rear curtain 114-2 continuously moves upward, to open the image pickup device 115. Since a data read-out operation is performed only when the image pickup device 115 is completely closed, the data read-out operation may be performed by changing the iris 112 to a closed state.

A photographing time associated with an operation of the shutter 114 in a photographing operation according to the present embodiment will be explained with reference to FIG. 4.

When the shutter-release button is completely pressed in a live view state as illustrated in illustration 4A, 70 ms is spent for the closed state illustrated in illustration 4C and 4 ms is spent for an exposure corresponding to illustrations 4D through 4F. After the exposure is completed, 180 ms is spent for a data read-out operation. In FIG. 4, at a time overlapping with a duration for which the data read-out operation is performed, the iris 112 is changed from an opened state to a closed state, and the shutter 114 is opened. That is, at a time when a data read-out time, for example, 110 ms, elapses, the opening preparation state corresponding to illustrations 4H through 4I starts. To this end, the front curtain 114-1 and the rear curtain 114-2 of the shutter 114 are controlled to move upward. The front curtain 114-1 and the rear curtain 114-2 move upward while contacting each other for a predetermined period of time. After a predetermined period of time elapses, the front curtain 114-1 moves downward, and after a predetermined period of time elapses, the front curtain 114-1 moves upward to be coupled to the rear curtain 114-2. In this case, the iris 112 is changed from the small iris state (opened state) to the closed state to cover the image pickup device 115. At a time when the data read-out operation ends, that is, at a time when 180 ms elapses after the data read-out operation starts, the front curtain 114-1 is controlled to move downward and is maintained in the opened state of illustration 4L, and a live view state for next photographing is maintained as in illustration 4M. Accordingly, a total of 254 ms is spent as a total photographing time, that is, from pressing the shutter-release button to preparing for next photographing in a live view. Accordingly, a photographing time of FIG. 4 may be shorter a photographing time of FIG. 3 by about 70 ms, and a live view image for next photographing may be displayed to a user about 70 ms earlier.

Figure 5:
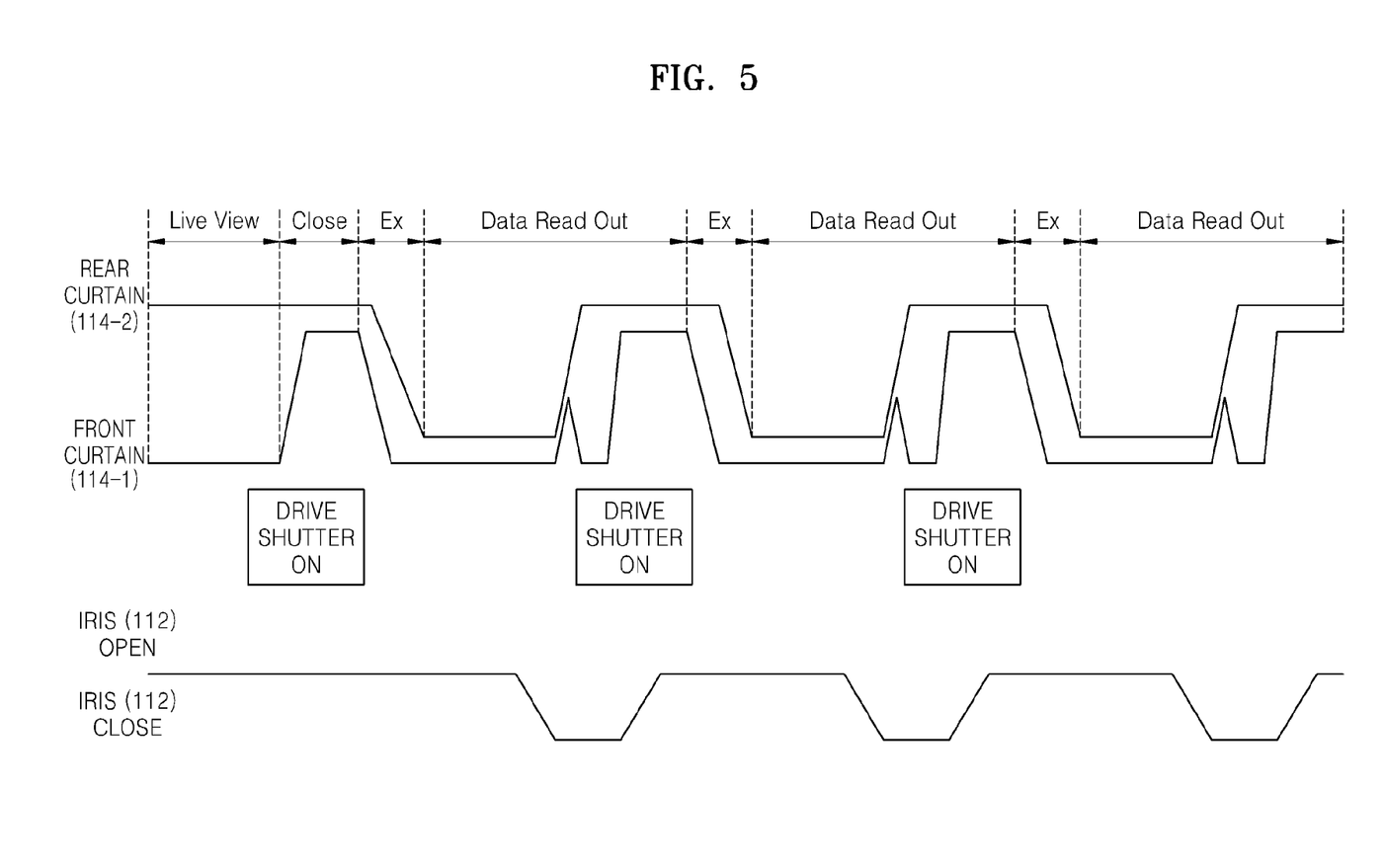
FIG. 5 is a diagram for explaining a movement of the shutter and a continuous photographing operation, according to another embodiment.

FIG. 5 is a diagram for explaining a movement of the shutter 114 and a continuous photographing operation, according to another embodiment.

When compared with FIG. 4, after one image is captured (see illustrations 4A-4L), a continuous photographing operation is performed for a time taken to expose and read out data. For a duration for which data corresponding to a preset number of images to be continuously captured is read out, the iris 112 is opened and closed and the shutter 114 is opened as shown in FIG. 4. Accordingly, if a number of images to be continuously captured is set to 3, since 823 ms is spent in a conventional method whereas 622 ms is spent according to the present embodiment, a continuous photographing time may be reduced by about 210 ms compared to that of the conventional method, and a live view image for next photographing may be displayed to a user about 210 ms earlier.

Figure 6:
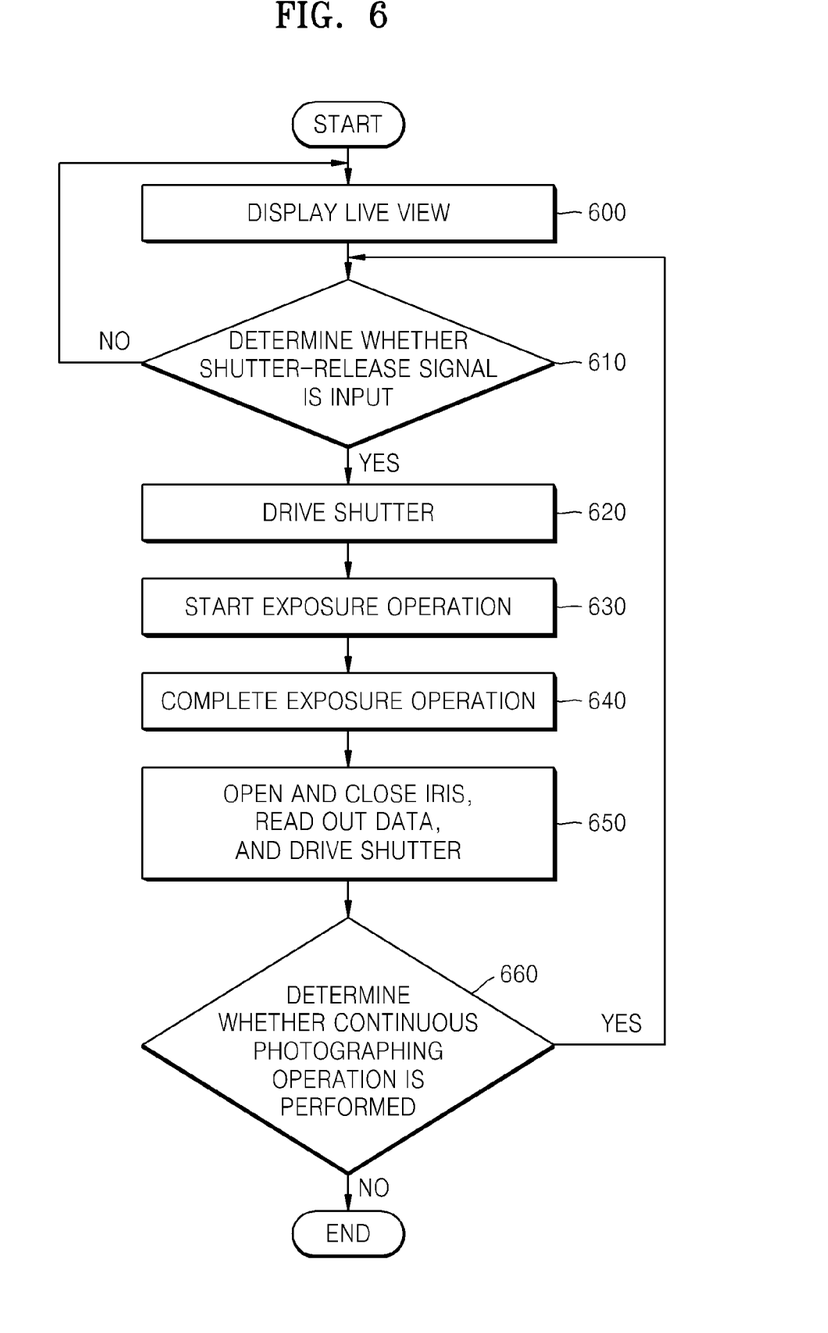
FIG. 6 is a flowchart illustrating a method of controlling the digital photographing apparatus of FIG. 1, according to an embodiment.

FIG. 6 is a flowchart illustrating a method of controlling the digital camera 100 of FIG. 1, according to an embodiment.

Referring to FIG. 6, in operation 600, a live view is displayed. In operation 610, it is determined whether a shutter-release signal is input. If it is determined in operation 610 that a shutter-release signal is input, the method proceeds to operation 620. In operation 620, the shutter 114 is driven. If it is determined in operation 610 that a shutter-release signal is not input, the method returns to operation 600. In operations 630 and 640, an exposure operation starts by driving the shutter 114 and after a predetermined period of time, that is, an exposure time, elapses, the exposure operation is completed.

In operation 650, a data read-out operation for reading out data from the image pickup device 115 starts. The data read-out operation may be performed only when the image pickup device 115 is completely closed from light. Accordingly, in this case, the shutter 114 completely covers the image pickup device 115. In operation 650, at a time overlapping with a duration for which the data is read out, the shutter 114 is driven, and the iris 112 is opened and closed when the shutter 114 is driven. That is, during the data read-out operation of operation 650, the shutter 114 is opened at a specific time. Even though the shutter 114 is opened, since the iris 112 is closed to close the image pickup device 115, the data read-out operation is not affected.

In operation 660, it is determined whether a continuous photographing operation is performed. If it is determined in operation 660 that a continuous photographing operation is performed, the method returns to operation 610. If it is determined in operation 660 that a continuous photographing operation is not performed, the method ends.

As described above, according to the one or more embodiments, a photographing time may be reduced by performing an operation of reading out imaging data and an operation of opening a shutter in parallel.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The digital photographing apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art, specifying the presence of stated features, integers, steps, operations, members, components, and/or groups thereof, but not precluding the presence or addition of one or more other features, integers, steps, operations, members, components, and/or groups thereof. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," "primary," "secondary," etc.

may be used herein to describe various elements, these elements should not be limited by these terms, which are only used to distinguish one element, region, component, layer, or section from another, and not to denote any order, quantity, or importance. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital photographing apparatus, the method comprising:
   driving a shutter according to a shutter-release signal;
   exposing an image pickup device to light as the shutter is driven;
   reading out data from the image pickup device for a data read-out time after the exposure, and blocking light incident on the image pickup device during the data read-out time, and
   at a time overlapping with a duration for which the data read-out operation is performed:
   closing an iris; and
   opening the shutter.

2. The method of claim 1, wherein light incident on the image pickup device is blocked by using an iris.

3. The method of claim 1, wherein the shutter is opened when the light incident on the image pickup device is blocked during the data read-out time.

4. The method of claim 2, wherein light is incident on the image pickup device after the shutter is opened.

5. The method of claim 2, wherein the data read-out time comprises:

a first time for which light incident on the image pickup device is blocked by using an iris, and data is read out from the image pickup device after the shutter is closed when the iris is opened;

a second time for which the iris is closed, and data is continuously read out from the image pickup device when the shutter is closed;

a third time for which data is continuously read out from the image pickup device when the shutter begins to be opened when the iris is closed; and a fourth time for which the shutter stops being opened when the iris is closed and data stops being read out from the image pickup device.

6. The method of claim 3, wherein the exposing of the image pickup device and the reading of the data are repeatedly performed in order to perform a continuous photographing operation.

7. The method of claim 1, wherein the shutter is a focal plane shutter.

8. A digital photographing apparatus comprising:
an image pickup device that captures an image; and
a digital signal processor that:
outputs a control signal for driving a shutter according to a shutter-release signal;
outputs a control signal for exposing the image pickup device to light as the shutter is driven;
reads out data from the image pickup device for a data read-out time after the exposure;
outputs a control signal for blocking light incident on the image pickup device during the data read-out time; and
at a time overlapping with a duration for which the data read-out operation is performed:
closes an iris; and
opens the shutter.

9. The digital photographing apparatus of claim 8, wherein light incident on the image pickup device is blocked by using an iris.

10. The digital photographing apparatus of claim 8, wherein the digital signal processor opens the shutter when light incident on the image pickup device is blocked during the data read-out time.

11. The digital photographing apparatus of claim 10, wherein light is incident on the image pickup device after the shutter is opened.

12. The digital photographing apparatus of claim 8, wherein a time taken by the digital signal processor comprises:
a first time for which the digital signal processor reads out data from the image pickup device after the shutter is closed when the iris is opened;
a second time for which the digital signal processor closes the iris, and continuously reads out data from the image pickup device when the shutter is closed;
a third time for which the digital signal processor continuously reads out data from the image pickup device when the shutter begins to be opened when the iris is closed; and
a fourth time for which the digital signal processor stops opening the shutter when the iris is closed and stops reading out data from the image pickup device.

13. The digital photographing apparatus of claim 8, wherein the digital signal processor repeatedly performs the exposing of the image pickup device and the reading of the data in order to perform a continuous photographing operation.

14. The digital photographing apparatus of claim 9, wherein the digital signal processor comprises:
a shutter driver that outputs a driving control signal for opening and closing the shutter;
an iris driving controller that closes the iris before data is read out, and opens the iris according to a set value after the data is read out; and
a data reader that reads out data from the image pickup device after the image pickup device is exposed to light.

15. The digital photographing apparatus of claim 8, wherein the shutter is a focal plane shutter.

* * * * *